Aug. 2, 1960 W. W. WAHLGREN 2,947,961
TRANSFORMER OR REACTOR CORE STRUCTURE
Filed Jan. 7, 1959 3 Sheets-Sheet 1

INVENTOR.
WALLACE W. WAHLGREN
BY
*John W. Ralls*
ATTORNEY

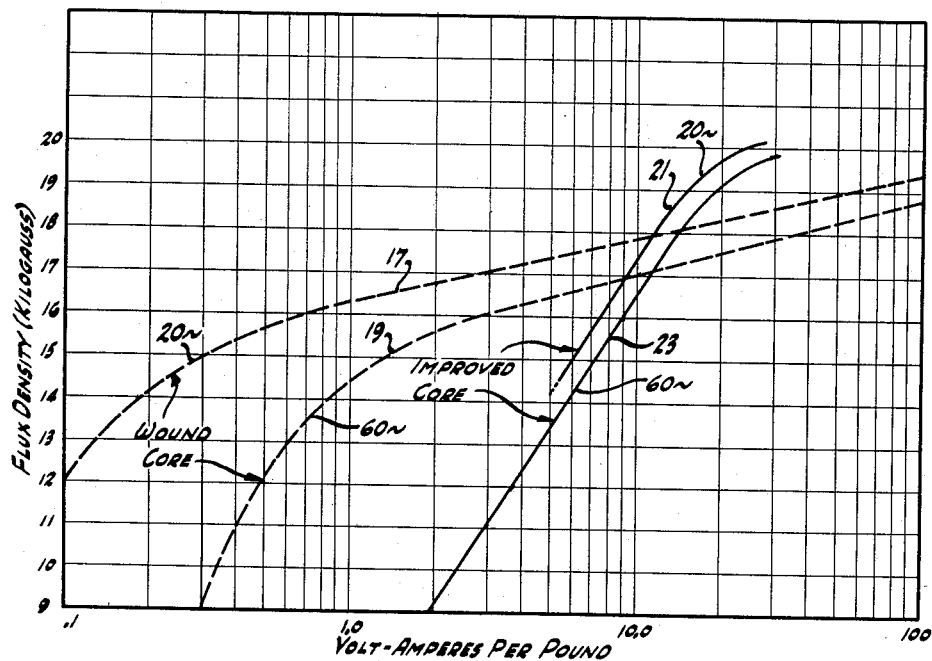
FIG·3
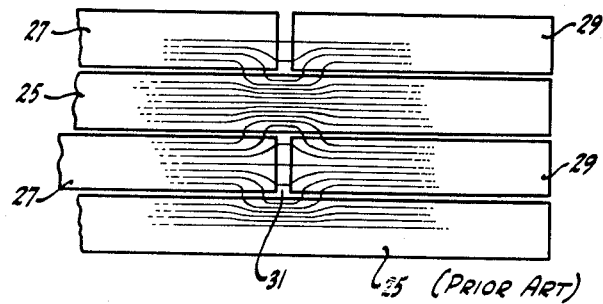
FIG·4
INVENTOR.
WALLACE W. WAHLGREN
BY
ATTORNEY

Aug. 2, 1960 W. W. WAHLGREN 2,947,961
TRANSFORMER OR REACTOR CORE STRUCTURE
Filed Jan. 7, 1959 3 Sheets-Sheet 3

INVENTOR.
WALLACE W. WAHLGREN
BY
ATTORNEY 2,947,961

TRANSFORMER OR REACTOR CORE STRUCTURE

Wallace W. Wahlgren, Oakland, Calif., assignor to Electro Engineering Works, San Leandro, Calif., a corporation of California Filed Jan. 7, 1959, Ser. No. 785,438

9 Claims. (Cl. 336—216)

This invention relates to transformers, inductors, and the like, having improved, stacked-core structures that permit higher flux densities in the winding sections without saturation of the core material elsewhere, particularly at the core joints and corners. The invention is especially advantageous in broad-band electromagnetic devices which must operate over wide frequency ranges, and in fixed-frequency devices that operate at high flux densities, but it is not limited thereto. In actual practice, the new cores have proved superior in significant respects, not only to prior stacked cores, but also to more costly wound cores.

In the design of electromagnetic devices, such as transformers and inductive reactors, high flux densities in the winding sections of the core may be desired. A limitation arises from the fact that near-saturated iron, anywhere in the magnetic circuit, causes odd-harmonic waveform distortion and increased core losses. Also, in oriented electrical steels, frequently used as high-quality core materials, saturation and waveform distortion occur at much lower flux densities wherever the magnetic flux is non-parallel to the rolling direction of the steel. In general, the greatest difficulties arise in the design of core joints and corners. At high flux densities in conventional stacked cores with interleaved joints, the major portion of the iron-exciting current is that due to saturation of the core material of the joints.

An object of this invention is to eliminate local regions of core iron that may become more nearly saturated than the winding sections of the core, and particularly the over-saturated regions that are almost invariably present in the vicinity of the joints of conventional stacked cores.

For reducing core losses and waveform distortion at high inductions, it is important to minimize the amount of fringing or non-axial flux that jumps from one lamination to an adjacent one. To this end, the elimination of ferromagnetic material extending across the gaps and joints of the core, and reduction of the flux densities in the gaps and joints, are desirable. In other words, in terms of magnetic-circuit geometry a butt joint should be superior to a lap joint or interleaved construction. On the other hand, a simple butt joint is deficient in mechanical strength; and as a practical matter it is not feasible, with external clamps alone, to hold the two abutting parts in sufficiently fixed and rigid relation to each other and to prevent movements that vary the reluctance of the joint and cause other objectionable effects. The present invention provides a core joint having essentially the magnetic characteristics that a butt joint should have (but does not achieve in prior constructions), with the mechanical strength characteristic of an interleaved construction.

Even with wound cores a gap or joint may be required, and considerable fringing on non-axial flux may be present in the vicinity of the gap, and may over-saturate local regions within the iron. In the case of stacked cores of oriented material there is the additional consideration that a major portion of the flux in the iron near the gap may be directed at an angle to the rolling direction, which lowers the flux density at which saturation occurs. Another object of this invention is to provide cores having gaps and joints of substantially larger sectional area than the winding sections of the core, whereby fringing flux is substantially reduced and over-saturation of the iron near the gap or joint is avoided.

Briefly stated, magnetic cores according to the present invention are constructed from stacked laminations of ferromagnetic material, preferably oriented electrical steel. Some of these stacked laminations make up the winding legs, and others form yokes that connect the winding legs together and complete the magnetic circuit. The majority—at least 80%, and preferably about 95%—of the laminations in the winding legs are substantially equal in length to the total height of the core, and extend for some distance beyond each end of the windings thereon. The remaining laminations of the winding legs are somewhat shorter, and extend but slightly beyond each end of the windings. There is at least one of the shorter laminations interiorly disposed in each stack constituting a winding leg; and preferably about 5% of the laminations in each winding leg are of the shorter length, disposed singly at equal intervals throughout the stack, so that the two end portions of each winding leg, extending beyond each end of the windings, contain a plurality of thin grooves, each one lamination thick, spaced at intervals of about twenty lamination thicknesses.

The yokes are made up of ferromagnetic laminations stacked together with tie plates, which preferably are of non-ferromagnetic material such as stainless steel. The ferromagnetic laminations of each yoke are equal in number to the longer laminations of each winding leg—i.e., about 95% of the total laminations in a stack—while the tie plates of each yoke are equal in number to the shorter laminations of a winding leg, and are similarly disposed through the thickness of the stack. Furthermore, the tie plates extend somewhat beyond each end of the magnetic yokes, and form a plurality of tongues that fit into the grooves at an end of a winding leg. Thus, a type of tongue-and-groove or interleaved mechanical joint is formed, which has considerable mechanical strength when the laminations are clamped together, and which effectively prevents objectional movements between the parts on each side of the joint.

Magnetically, the joint is essentially a butt joint between the longer laminations of the winding leg and the ferromagnetic laminations of the yoke. Preferably the yoke laminations are wider than the winding-leg laminations by a factor of at least 1.1 and advantageously 1.2 or more. The gap or joint runs along a side of the winding leg, and over the end as well if so desired, and has a sectional area substantially greater than that of the winding leg so that fringing flux is kept small and over-saturation of the iron near the joint is avoided even though there are flux paths at an angle to the rolling direction of the oriented core material.

In preferred embodiments the tie plates are of non-ferromagnetic material and there is essentially no iron extending across the joint. Where requirements are less severe, the tie plates may be made of ferromagnetic electrical steel, in which case the tie plates will be saturated by the magnetic flux, and some waveform distortion will occur. However, even with ferromagnetic tie plates the distortion is considerably less than with conventional stacked cores having interleaved laminations, since the tie plates occupy a maximum of 20%, and preferably only about 5%, of the sectional area.

One of the factors limiting the bandwidth of wideband electromagnetic devices is the maximum flux density that can exist in the winding sections without the excessive waveform distortion, losses, and iron-magnetizing currents that result from over-saturation elsewhere in the core. Linearity of the exciting-current curve is especially important, because at constant voltage the flux density is inversely proportional to frequency. Hence, one of the advantages achieved with the present invention is an extension of the bandwidth and linearity of wideband transformers, inductors, and the like. In fixed-frequency operation, linearity of the exciting-current curve is less important, but the high inductions which this invention makes possible without local over-saturations and attendant losses still provide significant advantages. Moreover, the improved cores compare favorably with conventional stacked cores in size, weight, cost and ease of manufacture, and they can be mounted and installed in the same manner.

The foregoing and other aspects of this invention may be understood better from the following illustrative description and the accompanying drawings. The scope of the invention is pointed out in the appended claims.

Fig. 1 of the drawings is a plan view of a transformer embodying the invention, wherein the non-ferromagnetic tie plates are represented by heavy lines;

Fig. 3 is a graphical representation of the relationships between magnetizing volt-amperes per pound of core material and flux density in transformers having grain-oriented, wound cores and in cores of same material constructed in accordance with the present invention;

Fig. 4 is an enlarged fragmentary view of the corner of the prior-art stacked core with interleaved laminations, illustrating typical flux paths in the vicinity of a joint;

Figure 1:
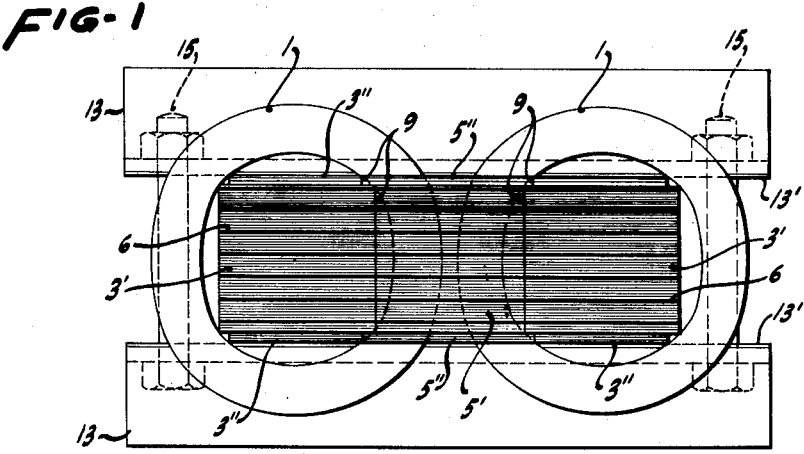
Figure 2:
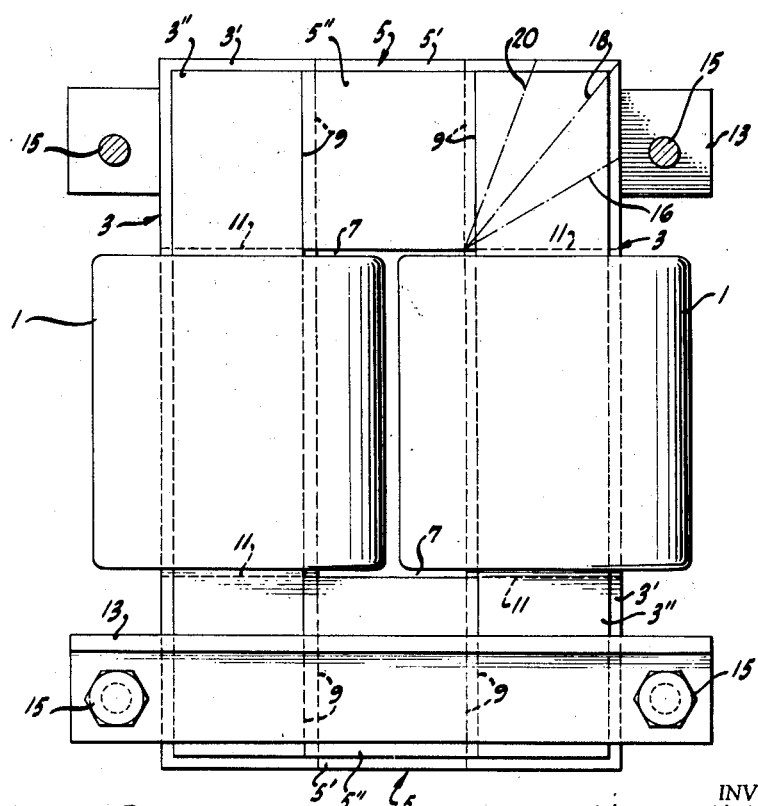
Fig. 2 is a side elevation of the transformer of Fig. 1, part of the clamp 13 and bolts 15 being cut away in order to show more clearly the construction at the corners of the core.

Figs. 1 and 2 are a plan view and a side elevation, respectively, of a transformer of the character here considered, the relative dimensions of which are typical. A transformer of this type comprises at least two windings 1, which may be divided into primaries and secondaries. Whether or not this is done makes no difference as far as the present invention is concerned, and the windings as illustrated show only their over-all dimensions, which may be divided between various circuits as required. The same structure, except for winding divisions and connections, might also form an inductor or the like. The present invention is concerned with the core structure, upon which any desired windings may be placed.

The windings 1 are disposed, respectively, on the two parallel winding legs 3 of the core. Each of these legs consists of a stack of ferromagnetic laminations, preferably made from oriented electrical steel with its rolling direction (direction of maximum permeability) parallel to the axes of the windings. In order to obtain a maximum cross-section of iron within the inside diameter of the windings, the legs 3 are preferably of cruciform cross-section, comprising a main body of relatively wide laminations 3' flanked on either side by a smaller number of somewhat narrower laminations 3''. Such cruciform cores are well known in the art and their advantages need not be elaborated here.

Of the ferromagnetic laminations forming the winding legs 3 of the core, at least 80%, and preferably 95%, have a length substantially equal to the height of the core, including the length of the winding with its insulating wrappings, if any, the width of yokes 5, which extend between and connect the two winding legs at either end, and any slight clearance 7 which may be left between the ends of the windings and the yokes for manufacturing reasons. Although there is a small difference in the lengths of laminations 3' and 3'', as shown, in both cases a majority of the laminations extend a considerable distance beyond each end of the windings. In order to get the length of the magnetic circuit as short as possible, clearances 7 will normally be made very small and in many cases the yokes will abut tightly against the ends of the assembled windings.

The remaining 20% or less of the ferromagnetic laminations in the winding legs are substantially equal to the length of the windings plus any clearance 7 that may be allowed, and thus extend only slightly beyond the ends of the windings. These shorter laminations are preferably interleaved at substantially uniform intervals throughout the stack so that the two end portions of each winding leg, extending beyond the ends of the winding thereon, contain a plurality of grooves, each one lamination thick, spaced at intervals of five or more—preferably about twenty—lamination thicknesses.

The yokes 5, which connect the winding legs, each consists of a stack of ferromagnetic laminations, 5' and 5'', among which are interleaved tie plates 6, preferably of non-ferromagnetic material such as stainless steel, represented by heavy lines in Fig. 1. The ferromagnetic laminations of each yoke are equal in number to the majority or longer ones of the laminations 3' and 3'' of the winding legs. The laminations 5' and 5'' may be of oriented electrical steel, with its rolling direction (direction of maximum permeability) disposed longitudinally—i.e., horizontally, at right angles to that of the steel in the winding legs. The laminations 5' and 5'' are relatively short, so that their ends abut on the sides of corresponding leg laminations: each lamination 5' has each of its ends abutted against the side of a lamination 3' of a winding leg; and each of the slightly longer laminations 5'' has each of its ends abutted against the side of a lamination 3'' of a winding leg. The laminations 5' and 5'' are approximately 1.2 times as wide as the laminations 3' and 3'' on which they abut.

The tie plates 6 are equal in number to the minority or shorter ones of laminations 3' and 3'', and are similarly disposed within the stack. Also, the tie plates 6 are considerably longer than the laminations 5' and 5'', and extend beyond each end of the magnetic yoke a distance equal to the width of a winding leg 3. Thus, tie plates 6 form a plurality of tongues at each end of each magnetic yoke. These tongues fit into the grooves at the ends of the winding legs 3, so that a strong, tongue-and-groove mechanical joint is formed between each winding leg and each yoke.

The laminations used in cores of this character are so thin—e.g., 12 or 14 mils—that they cannot be satisfactorily shown to scale in the drawings. The general relationship is, however, indicated in Fig. 1. The light lines extending laterally across the figure represent the ferromagnetic laminations; and the joints where these abut are indicated by the lines 9. The heavier lines 6 appearing at intervals represent the tie plates, which are actually of the same thickness as the ferromagnetic laminations. Sides of the tie plates abut on the ends of the shorter ones of laminations 3' and 3'' of the winding legs as indicated by lines 11 in the drawings.

As in conventional constructions, the core laminations are held together by suitable clamps which may, for example, comprise angle sections 13, clamped together by bolts 15. It is to be noted, however, that preferably the bolts do not pass through the laminations themselves; should it be necessary structurally that they do so, the width of the yokes should be increased to compensate for the diminished magnetic cross-section resulting from the bolt-holes. To reduce losses from magnetic flux in clamps 13, these may be separated from the core by spacers 13' of non-ferromagnetic material. Also, a non-ferromagnetic tie plate may be disposed between the outermost lamination 5' and the innermost lamination 5" to prevent over-saturation of the laminations adjacent to the step in gap 9.

The advantages to be gained through the use of the present invention will be appreciated from a consideration of the graphs of Fig. 3, wherein flux densities in kilogauss are plotted against exciting volt-amperes per pound as abscissas, in semilogarithmic coordinates. Curves 17 and 19 show the volt-amperes per pound of core material for a transformer employing a loop or wound core of grain-oriented electrical steel, curve 17 being taken at 20 cycles per second and curve 19 at 60 cycles. These curves are replotted from published data on one such material. Curves 21 and 23 are comparable curves for a transformer in accordance with the present invention. It is to be noted that the flux densities plotted are those in the portion of the core within the windings. The volt-amperes, however, represent those required to magnetize the entire core.

Of particular interest in these curves are the portions to the right of the cross-over points between curves 17 and 21, representative of high-induction 20-cycle operation, and between curves 19 and 23, representative of high induction, 60-cycle operation. If we assume a limiting value of excitation at 20 volt-amperes per pound, the prior-art loop core will develop a flux density of 18.15 kilogausses while the improved core will develop 19.6 kilogausses. Considered in another fashion, if both cores are to be worked at the maximum flux density shown by curve 17, i.e., 19.4 kilogausses, the loop core will require an excitation of 100 volt-amperes per pound, but the improved core will require only 17.5 volt-amperes per pound. Considering the 60-cycle curves, much the same effects are obtained. Thus, taking the 20 volt-ampere per pound points on curves 19 and 23, the loop core shows a flux density of 17.3 kilogausses, the core of the present invention 19.1 kilogausses. To achieve the maximum flux density shown with a loop core requires an excitation of 100 volt-amperes per pound, whereas the same flux density in the improved core requires only 18 volt-amperes excitation per pound.

Below the cross-over points of the respective curves the core of the present invention requires higher magnetizing currents than does the loop core, for equal flux densities. For these lower flux densities, the magnetizing current is not the critical factor and the higher magnetizing currents required are unimportant. What is important is the greater linearity of the curves for the improved core. It will be noted that curves 17 and 19 have a marked curvature between about 14 and 16 kilogausses, and a relatively small slope in the high-induction region beyond 16 kilogausses, which shows that parts at least of the core are at or near saturation. With the improved core, represented by curves 21 and 23, saturation effects are evidently insignificant below 19 kilogausses.

In the improved cores, maximum flux densities occur only within the winding sections—i.e., those portions of the winding legs that lie inside of the windings—where the flux paths are substantially parallel to the rolling direction of the oriented steel. Outside of these portions the flux turns the corner to enter the yokes, following paths which will result in minimum over-all core reluctance. To a close approximation this means that at any point beyond the inner corners of the core window, where the winding legs and yokes meet, the paths followed are normal to the lines 16, 18 and 20 (which have been drawn radiating from this corner in Fig. 2) and enter the yokes normal to the joint at the abutment of the leg and yoke laminations. Considering cross-sections of the core taken along lines 16, 18 and 20, the average flux density in each such cross-section is substantially in inverse proportion to the length of the line along which the section was taken.

Using the preferred widths of the yoke laminations—each 1.2 times the width of the winding leg laminations against which it abuts—the average flux density in the plane of line 16 is approximately 80% the maximum density within the winding sections, that in the plane indicated by the line 18 is about 50% of the maximum, and that in the plane of line 20 is about 77% of maximum. The permeability and saturation flux density of the oriented steel is lower in the directions normal to those planes than it is longitudinally of the winding legs, but this is compensated by the lower flux densities resulting from the greater area of the cross-sections. Furthermore, the joint area is 1.2 times the sectional area of the winding leg, and the correspondingly lower flux densities across the joint reduce the amount of fringing flux.

The proportions given prevent over-saturation at the corners of a core using oriented electrical steel of typical, commercial quality. Other proportions can readily be computed for specific materials using the directional permeability and saturation data supplied by the steel manufacturers. For example, see "Armco Oriented Electrical Steels," fourth edition, published in 1957 by Armco Steel Corporation, Middletown, Ohio. In a core of the proportions shown only about 3/7 of the core material is at maximum induction. In cores according to the present invention, the magnetic circuit joints are all essentially butt joints, instead of the interleaved lapped joints that are most commonly used to reduce the reluctance of the core. It can be shown that the butt joints of the present construction contribute a smaller percentage to the total reluctance at high inductions than would conventional lap joints. This is because the conventional, lap-joint construction inevitably leads to local over-saturation of the core material, whenever the winding sections are operated at high inductions.

The reason for this can be best explained by reference to Fig. 4, which shows the flux distribution across a lap joint of the ordinary type. In this figure there are shown laminations 25, for example, the longer leg laminations that extend across the full width of the yoke. Interleaved between these laminations are the shorter leg laminations 27 which abut against the sides of yoke laminations 29. Inevitably there will be some gap 31 between laminations 27 and 29, even when the joint is nominally of the contact type. At gap 31 the flux divides between the gap and the laminations on either side of it, in such manner as to make the total reluctance of the flux paths a minimum. At moderate flux density the permeability of the paths around the gap is hundreds, or possibly thousands, of times as great as the unity permeability of the gap itself. Some flux passes through the gap but most of it is diverted to the paths on either side of it, and the flux lines bunch in the overlying laminations for a short distance on each side of the gap, as shown.

At maximum flux densities, where the critical factors considered in the present invention come into play, the effect is quite different. The laminations overlying the gaps, where lapped corners are used, approach saturation. Very little additional flux can be carried by these laminations without over-saturating them; in fact, they do over-saturate, and also a larger proportion of the flux between laminations 27 and 29 must pass across the gap 31. Hence, the reluctance of the joint varies during each alternating-current cycle, and waveform distortion with all of its deleterious effects ensues.

According to the present invention, there are substantially no ferromagnetic laminations extending across the gaps at the magnetic circuit joints, and therefore the amount of non-axial, fringing flux is greatly reduced. The non-ferromagnetic tie plates have approximately the same permeability as air, and therefore most of the flux passes straight across the gap simply because there is no easier path for it to follow. The permeability of the air gaps—and of non-ferromagnetic materials—is low, but constant; hence, there is no saturation, no non-linearity, no waveform distortion, and within the air gap no appreciable loss.

Furthermore, at high inductions where interleaved laminations over-saturate, the incremental permeability in each case becomes approximately unity, but the butt joint of the present invention has the lower reluctance because of its greater cross-sectional area. With conventional interleaved corners, it should be remembered that there are two joints at each corner, and one of these can have a cross-sectional area no larger than that of the winding leg, irrespective of the core dimensions.

All of the above is based upon as close abutment between the leg and yoke laminations as can be secured, and a joint of sufficient mechanical strength to prevent intolerable movement between the parts. This mechanically secure abutment is obtained by the use of the tie plates hereinbefore described, and by clamping the ends of the yokes with clamps 13 and bolts 15 so as to hold yokes and legs together through frictional engagement with the tie plates. The tie plates have been described as preferably of non-magnetic material, such as stainless steel, but it should be obvious that they may be also of the same material used for the balance of the core, provided the consequent non-linearities are tolerable.

Figure 5:
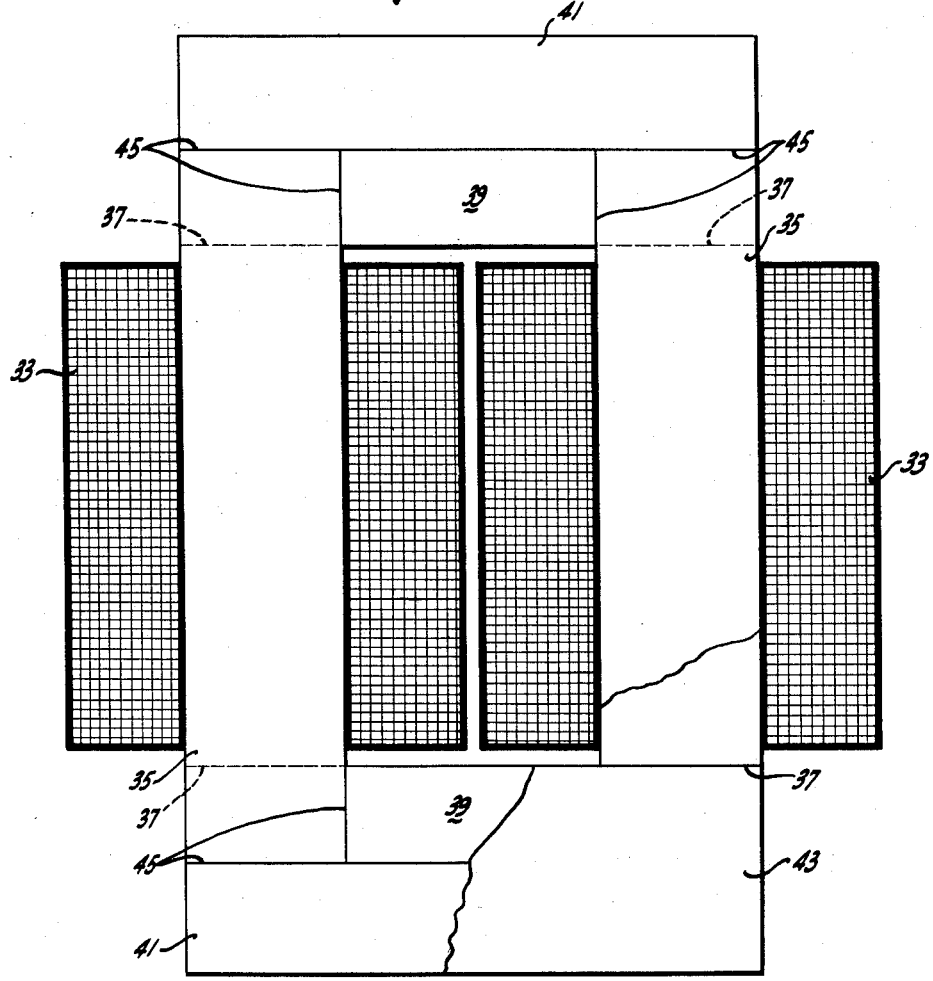
Fig. 5 is a vertical section of another transformer embodying this invention.

Fig. 5 shows another embodiment which may be used when maximum overall permeability is required with minimum saturation of local core regions. The two windings 33 are disposed on two winding legs 35, constructed in substantially the same manner as the winding legs of the embodiment previously described. That is to say, each leg 35 is composed of a stack of laminations of oriented electrical steel, with its rolling direction parallel to the axes of the windings. About 95% of the winding leg laminations extends a considerable distance beyond each end of the windings, while the remaining 5% extends but slightly beyond the winding ends. The shorter laminations are interleaved singly at intervals through the stack so that each end of the winding legs contains a plurality of grooves, each one-lamination thick, spaced at intervals of about twenty lamination thicknesses. The ends of the shorter laminations are indicated by lines 37.

The yokes which connect the winding legs and complete the magnetic circuit are composed of shorter ferromagnetic laminations 39, having ends which abut on the sides of the winding legs, and longer ferromagnetic laminations 41, which extend across the ends of the winding legs, as shown. The structure is held together by the non-ferromagnetic tie plates 43, each equal in length to the laminations 41 and equal in width to the sum of the widths of laminations 39 and 41. There are equal numbers of laminations 39 and 41, disposed side-by-side as shown, and about one-twentieth as many of the tie plates 43, disposed singly at equal intervals through the stacks. The tie plates form tongues fitting into the grooves of the winding legs for holding the winding legs and the yokes together, and additionally the tie plates hold laminations 39 and 41 together. Conventional clamping means are employed to compress the stacks, so that the laminations adjacent to the tie plates are held in firm frictional engagement therewith.

A particular feature of this embodiment is the exceptionally long joints 45 of the magnetic circuit. These joints extend not only along the sides of the winding legs but across the ends as well. In a typical design, the width of laminations 39 is 60% of the width of winding legs 35, and the width of laminations 41 is 70% or more of the width of the winding legs. Each joint 45 has an area equal to 160% of the cross-sectional area of a winding leg, and the flux density in the joint is correspondingly reduced. Hence, the flux density in and near the joint is less than two-thirds of the maximum flux density in the winding sections, and no local saturation of the core material occurs even though the flux near the joints is directed across the grain of the oriented core material and inductions in the winding sections may be exceptionally high.

In the yoke the flux divides between laminations 39 and 41. With the relative dimensions given above, laminations 39 carry about 38% of the flux at a flux density approximately 64% as great as the maximum flux density in the winding sections. Hence, laminations 39 may be made of lower-grade material for economy. Laminations 41 carry about 62% of the total flux at a flux density about 89% of the maximum in the winding sections. The flux density in laminations 41 can be reduced, if desired, by increasing their width.

The core structure shown in Fig. 5 is a superior one for cores requiring air gaps if there is a high alternating flux density or a high frequency flux where fringing and local saturation are undesirable. Of course, the laminations must be evenly cut, and they should be assembled with a contact joint unless a larger gap is specified. While two-legged cores for single-phase transformers and the like have been specifically described, it should be evident to those skilled in the art that the same principles may be used in constructing a three-phase transformer or inductor with three winding legs. Various other modifications to meet the needs of specific circuits and applications will be obvious to those skilled in the art. It is not intended, therefore, that the scope of the invention be limited to the apparatus specifically described; all intended limitations are set forth in the claims that follow.

I claim:

1. A core structure for transformers and like electromagnetic apparatus, comprising at least two legs adapted for carrying the windings of said apparatus, each of said legs comprising a stack of ferromagnetic laminations, yokes interposed between both ends of said legs, each of said yokes comprising a stack of ferromagnetic laminations closely abutting respective laminations of said legs, forming a magnetic circuit with essentially butt joints between said legs and yokes, each lamination of said yokes being wider than the laminations against which it is abutted by a factor of at least 1.1, a plurality of non-ferromagnetic tie plates interspersed at intervals through the stacks of laminations comprised in said yokes, said tie plates extending into slots formed in each end of said legs by including therein a like plurality of ferromagnetic laminations of shorter length than the majority of the laminations in said legs, each of said shorter laminations being abutted against one of the non-magnetic tie plates in each of said yokes, and clamping means for holding the interleaved laminations and the tie plates in frictional engagement, whereby the laminations of said legs and yokes are rigidly secured in closely abutting relationship.

2. An electromagnetic device comprising at least two windings of like axial length, a core leg extending through each of said windings and beyond each end thereof for a distance of at least 1.1 times the maximum width of said core legs, each of said core legs comprising a stack of straight, ferromagnetic laminations at least 80% of which are of a length equal to the total extension of said legs and the remaining ones whereof are substantially equal in length to said windings and are substantially uniformly interleaved with said first-described laminations, a pair of core yokes interposed between the extended ends of said core legs, said core yokes each comprising a stack of straight, ferromagnetic laminations which have their ends closely abutted against the sides of corresponding laminations of said core legs, and a plurality of tie plates interleaved with the ferromagnetic laminations of said yokes and extending across the ends of the shorter laminations of said core legs and interleaved between the longer laminations thereof, the widths of the laminations comprising said yokes being greater than that of the laminations against which they abut by a factor of at least 1.1, and means for clamping said yokes and the ends of said legs to hold the interleaved tie plates and laminations thereof frictionally to maintain the abutted laminations in close apposition.

3. A device in accordance with claim 2, wherein said tie plates are of non-ferromagnetic material.

4. A device in accordance with claim 2 wherein the number of said tie plates is less than 20% of the number of ferromagnetic laminations in said yokes.

5. A core structure for electromagnetic devices, comprising a plurality of legs and a plurality of yokes connecting the ends of respective legs, each leg consisting essentially of a stack of ferromagnetic laminations of two different lengths, at least 80% of said laminations being of the longer length, the remaining, shorter laminations being spaced at intervals through the stacks, forming a plurality of grooves at each end of each leg, each of said yokes consisting essentially of a stack of ferromagnetic laminations and a plurality of tie plates spaced at intervals through the stack, the tie plates in each yoke being substantially equal in number to the shorter laminations in each leg and similarly disposed in the stack, said tie plates being longer than the ferromagnetic laminations in the yoke and forming a plurality of tongues extending from each end of each yoke, said tongues being fitted into said grooves to form tongue-and-groove mechanical joints between said legs and said yokes, said ferromagnetic laminations of the yokes abutting on the longer laminations of the legs to form magnetic-circuit butt joints between the legs and the yokes.

6. A core structure as in claim 5, wherein each of said laminations is a strip of oriented electrical steel, and each of said tie plates is of non-ferromagnetic material.

7. A core structure as in claim 5, wherein the number of said shorter laminations is substantially 5% of the total number of laminations in each leg.

8. A core structure as in claim 5, wherein the ferromagnetic laminations of said yokes have ends abutting on the sides of the longer laminations of said legs, the yoke laminations being wider than the leg laminations, whereby the magnetic-circuit joints extend along sides of the legs and have cross-sectional areas larger than the cross-sectional areas of the legs.

9. A core structure as in claim 5, wherein the ferromagnetic laminations of said yokes comprise side-by-side strips of two different lengths, the shorter ones of said strips having ends abutting on the sides of the longer laminations of said legs, and the longer ones of said strips extending across the ends of the same laminations of said legs, whereby the magnetic-circuit joints extend along sides of the legs and also across the ends of the legs.

References Cited in the file of this patent

UNITED STATES PATENTS

| | | |
|---|---|---|
| 2,293,951 | Seastone | Aug. 25, 1942 |
| 2,300,964 | Putnam | Nov. 3, 1942 |